March 26, 1968 J. M. CRAIG 3,374,865
SNUBBER FOR DEPLOYING LINES
Filed Oct. 17, 1966

INVENTOR.
JIMMIE M. CRAIG
BY
V. C. MULLER
ROY MILLER
ATTORNEYS.

3,374,865
SNUBBER FOR DEPLOYING LINES
Jimmie M. Craig, China Lake, Calif., assignor to the
United States of America as represented by the
Secretary of the Navy
Filed Oct. 17, 1966, Ser. No. 588,269
1 Claim. (Cl. 188—1)

ABSTRACT OF THE DISCLOSURE

Shock absorber for a line disposed between a parachute and a suspended load in which a portion of the line is looped within a plastic deformable tube which compresses in stacked convolutions as the line increases in tension, the convolutions providing increasing frictional resistance against shortening of the loop as the loop ends are pulled from the tube.

---

The invention described herein may be manufactured and used by or for the Government of the United States of America for governmental purposes without the payment of any royalties thereon or therefor.

This invention relates to shock or energy absorbing apparatus and more particularly to improvements for use with a tensioned line subjected to a sudden snatch force.

In certain applications a line, such as a cable, rope or the like, is disposed between a support and a load which is subjected to a high tension force when the load is suddenly decelerated as the line becomes taught. While the line may be of sufficient strength to support the load after application of the snatch force it may be of insufficient strength to withstand the temporary high force which occurs during the snatch or deceleration period. As will be apparent, if the work developed during the deceleration period (force × time) can be absorbed over a longer period of time the instantaneous force in the line may be reduced, permitting the use of a line of minimum size and strength.

One of the objects of the invention is to provide a device of the type referred to which is simple in construction, inexpensive, efficient in operation, and subject to construction and assembly with readily available materials.

Another object is to provide a device which absorbs energy, first at a slow rate, and thereafter at an increasing rate, the rate during the period of energy absorption being an exponential function, rather than a linear one, which maintains the instantaneous force during the period below a predetermined force which might otherwise rupture the line in which it is disposed.

Still further objects, advantageous and salient features will become apparent from the description to follow, the appended claim, and the accompanying drawing in which:

Figure 1:
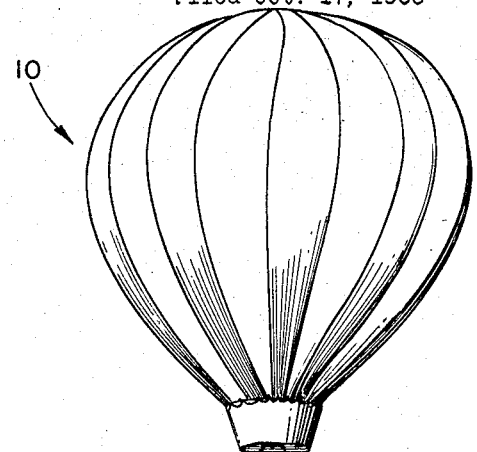
FIG. 1 is a side elevation of an exemplary environment of the invention.
Figure 3:
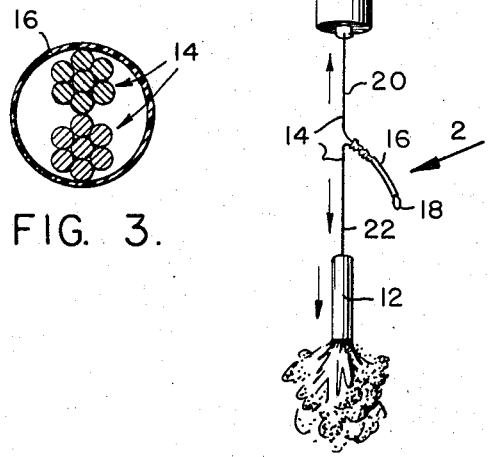
FIG. 3 is an enlarged section taken on line 3—3, FIG. 2.

Referring now to the drawing, and first to FIG. 1, which illustrates an exemplary environment of the invention in which a balloon 10 is employed to drop and support a flare 12, for illuminating a ground area, such as an aircraft landing field or the like, the flare, initially carried by the balloon to a desired locus, is dropped to a desired distance below the balloon by a supporting cable 14, one end of which is attached to the balloon and the other end to the flare. When the flare drops to a distance sufficient to remove the slack from the cable it is subjected to temporary high tension forces which will persist until the free fall of the flare is retarded and tension is reduced to a value only sufficient to support the weight of the flare.

During the period of retardation of the flare, a certain quantity of work, as expressed by the area under a force-time curve is developed and, as will be apparent, if this work can occur over an increased period of time the instantaneous force, or tension in the cable, may be reduced.

Figure 2:
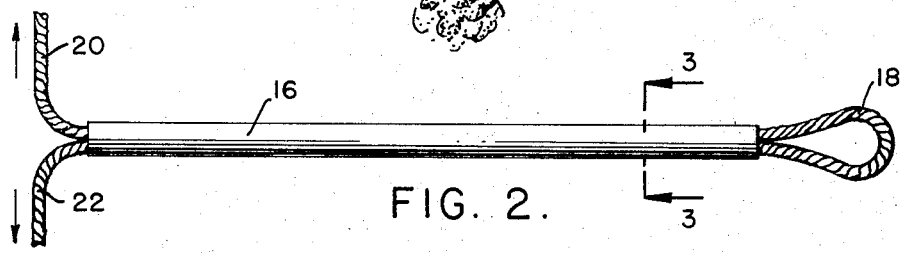
FIG. 2 is an enlarged detail of a portion of FIG. 1, as viewed in the direction of arrow 2, FIG. 1, in an initial position of parts.
Figure 2A:
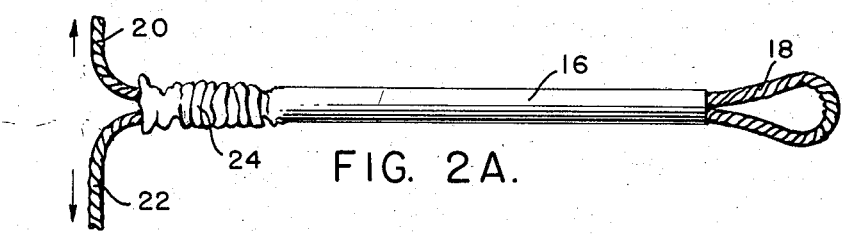
FIG. 2A is a like detail at a later position of parts.

The apparatus for reducing the instantaneous tension in the line which forms the subject of the invention, comprises a deformable tube 16, disposed between the ends of the line, the line extending through the tube, thence forming a loop or bight 18, and thence returning through the tube, as best shown in FIG. 2. FIG. 2 also illustrates the position of parts at the time the line becomes taught and at the beginning of retardation or deceleration of the flare. During the deceleration period, the upper portion 20 and lower portion 22 of the line are pulled from the tube, producing annular wrinkles or convolutions 24 (similar to a Sylphon) which stack adjacent each other, progressing toward the end adjacent loop 18. As a wrinkle forms, the inner wall of tube 16 is deformed into tight frictional engagement with the two runs of cable extending through the tube and as the number of wrinkles increases, the total frictional force of the tube on the two runs of the cable also increases. Thus, frictional work is performed between the line and tube, initially with considerable relative motion between the line and tube, when the initial snatch force is at a maximum, and decreasing as the flare load is decelerated. The line may be of any suitable material, such as steel cable, and the tube may be of any suitable deformable material, such as plastic tubing, the wall thickness being chosen to produce the desired frictional force and work during the desired time of deceleration of the load.

Obviously many modifications and variations of the present invention are possible in the light of the above teachings. It is therefore to be understood that within the scope of the appended claim the invention may be practiced otherwise than as specifically described.

What is claimed is:

1. Shock absorbing apparatus for use between a pair of members moveable relatively away from each other, comprising;
    (a) a flexible line, such as a cable, having opposite ends adapted to be secured to the members,
    (b) said line having a pair of laterally extending juxtaposed portions,
    (c) a deformable unreinforced plastic tube surrounding said portions adapted to be compressed and progressively shortened by the formation of a plurality of annular convolutions when said line is tensioned under shock loading, and permit said line to lengthen as said portions are progressively withdrawn from one end of the tube, said tube being so proportioned to said portions to effect increasing frictional resistance on said portions as the convolutions increase in number, and without rupture of the convolutions, whereby resistance to lengthening of the line continuously increases as the line lengthens,
    (d) said portions being joined at their outer ends by a loop in the line disposed exterior of and abutting the other end of the tube.

References Cited

UNITED STATES PATENTS

| | | |
|---|---|---|
| 2,163,274 | 7/1939 | Kessenich. |
| 2,353,872 | 7/1944 | Brickman ………… 188—1 X |
| 3,026,972 | 3/1962 | Hendry et al. ………… 188—1 |

DUANE A. REGER, *Primary Examiner.*